US012625386B2

(12) United States Patent
Adema et al.

(10) Patent No.: US 12,625,386 B2
(45) Date of Patent: May 12, 2026

(54) PROPORTIONAL FRAME DEFLECTION TO MAINTAIN GLASSES DISPLAY ALIGNMENT

(71) Applicant: Google LLC, Mountain View, CA (US)

(72) Inventors: Daniel Adema, Kitchener (CA); Timothy Paul Bodiya, Waterloo (CA)

(73) Assignee: Google LLC, Mountain View, CA (US)

( * ) Notice: Subject to any disclaimer, the term of this patent is extended or adjusted under 35 U.S.C. 154(b) by 418 days.

(21) Appl. No.: 18/297,394

(22) Filed: Apr. 7, 2023

(65) Prior Publication Data

US 2023/0324712 A1 Oct. 12, 2023

Related U.S. Application Data

(60) Provisional application No. 63/362,647, filed on Apr. 7, 2022.

(51) Int. Cl.
*G02C 5/16* (2006.01)
*G02B 27/01* (2006.01)
*G02C 13/00* (2006.01)

(52) U.S. Cl.
CPC ............. *G02C 5/16* (2013.01); *G02B 27/017* (2013.01); *G02C 13/001* (2013.01); *G02B 2027/0178* (2013.01)

(58) Field of Classification Search
CPC ...... G02C 5/16; G02C 13/001; G02B 27/017; G02B 2027/0178
See application file for complete search history.

(56) References Cited

U.S. PATENT DOCUMENTS

2022/0283439 A1 * 9/2022 Hong ................. G02B 27/0172

* cited by examiner

*Primary Examiner* — James C. Jones
(74) *Attorney, Agent, or Firm* — Brake Hughes Bellermann LLP

(57) ABSTRACT

Improved augmented reality smartglasses ensure alignment of displays in a head-mounted wearable device such as AR smartglasses by specifying a relationship between material properties of the frame at the shoulder and nose bridge. For example, such a material relationship may be a rigidity and/or stiffness characteristic. In some implementations, the specified relationship is that a difference between the first bending stiffness and the second bending stiffness is less than a tolerance (e.g., 5%, 1%, or less than 1%).

10 Claims, 8 Drawing Sheets

400

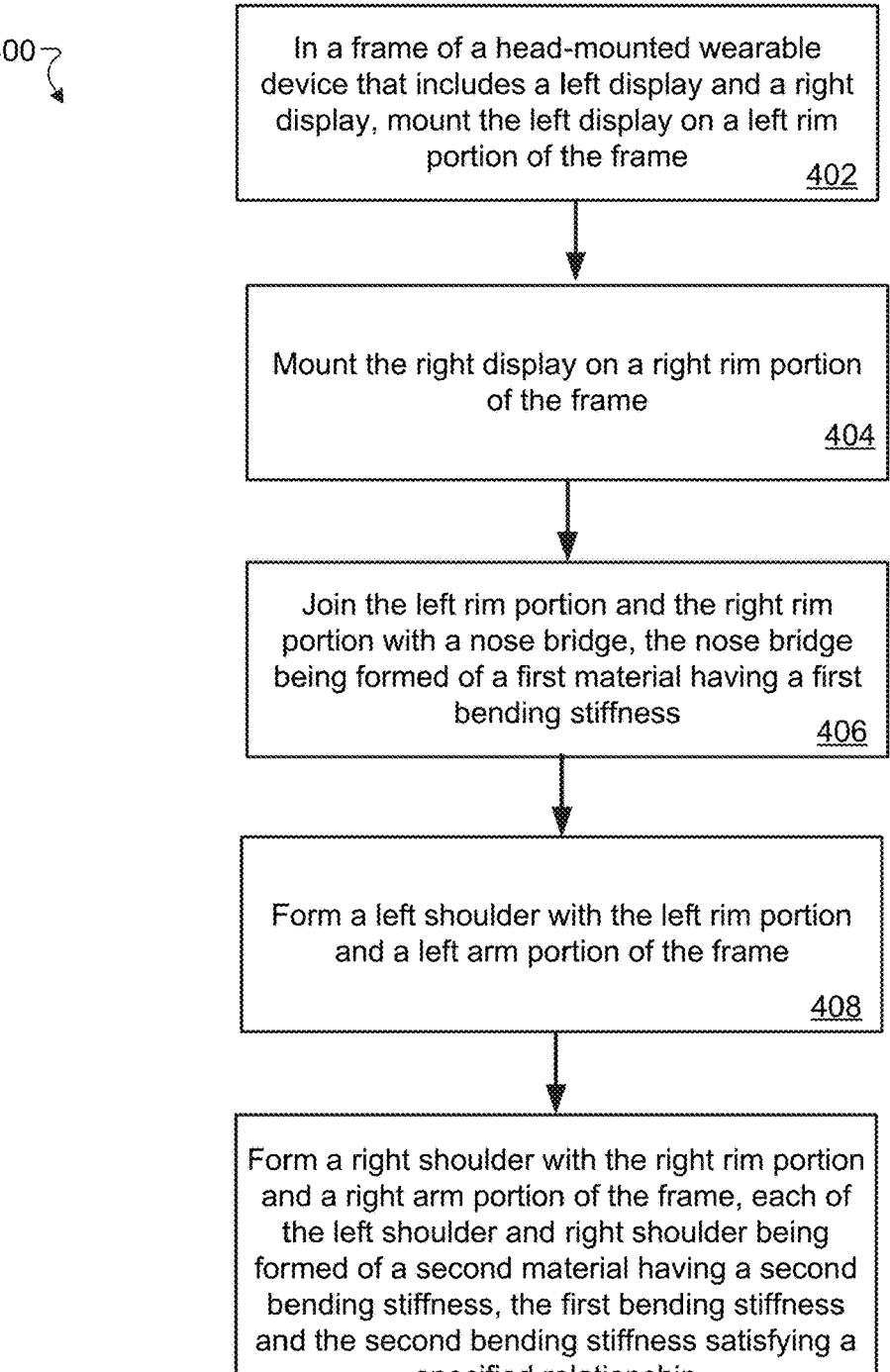

In a frame of a head-mounted wearable device that includes a left display and a right display, mount the left display on a left rim portion of the frame

402

Mount the right display on a right rim portion of the frame

404

Join the left rim portion and the right rim portion with a nose bridge, the nose bridge being formed of a first material having a first bending stiffness

406

Form a left shoulder with the left rim portion and a left arm portion of the frame

408

Form a right shoulder with the right rim portion and a right arm portion of the frame, each of the left shoulder and right shoulder being formed of a second material having a second bending stiffness, the first bending stiffness and the second bending stiffness satisfying a specified relationship

PROPORTIONAL FRAME DEFLECTION TO MAINTAIN GLASSES DISPLAY ALIGNMENT

CROSS-REFERENCE TO RELATED APPLICATION

This application claims priority to U.S. Provisional Patent Application No. 63/362,647, filed on Apr. 7, 2022, entitled "PROPORTIONAL FRAME DEFLECTION TO MAINTAIN GLASSES DISPLAY ALIGNMENT", the disclosure of which is incorporated by reference herein in its entirety.

TECHNICAL FIELD

This description relates in general to head mounted wearable devices, and in particular, to head mounted wearable computing devices including a display device.

BACKGROUND

Eyewear in the form of glasses may be worn by a user to, for example, provide for vision correction, inhibit sun/glare, provide a measure of safety, and the like. These types of eyewear are typically somewhat flexible and/or deformable, so that the eyewear can be manipulated to comfortably fit the user. An ophthalmic technician can typically manipulate rim portions and/or temple arm portions of a frame of the eyewear, for example, through cold working the frame and/or heating and re-working the frame, to adjust the eyewear for a particular user. In some situations, this re-working of the frame may occur over time, through continued use/wearing of the eyewear by the user. Manipulation in this manner, due to the flexible and/or deformable nature of the material of the frame and/or lenses of the eyewear, may provide a comfortable fit while still maintaining ophthalmic alignment between the eyewear and the user. In a situation in which the eyewear is a head mounted computing device including a display, such as, for example, smartglasses, this type of flexibility/deformation in the frame may cause inconsistent alignment or the display, or misalignment of the display. Inconsistent alignment, or misalignment of the display can cause visual discomfort, particularly in the case of a binocular display. A frame having rigid/non-flexible components, while still providing some level of flexibility in certain portions of the frame, may maintain alignment of the display, and may be effective in housing electronic components of such a head mounted computing device including a display.

SUMMARY

In one general aspect, a head-mounted wearable device includes a left display and a right display. The head-mounted wearable device also includes a frame worn by a user. The frame includes a left rim portion in which the left display is mounted and a right rim portion in which the right display is mounted. The frame also includes a nose bridge joining the left rim portion and the right rim portion, the nose bridge being formed of a first material having a first bending stiffness. The frame further includes a left arm portion forming a left shoulder with the left rim portion, and a right arm portion forming a right shoulder with the right rim portion, each of the left shoulder and right shoulder being formed of a second material having a second bending stiffness, the first bending stiffness and the second bending stiffness substantially satisfying a specified relationship.

The details of one or more implementations are set forth in the accompanying drawings and the description below. Other features will be apparent from the description and drawings, and from the claims.

BRIEF DESCRIPTION OF THE DRAWINGS

FIG. 4 is a flow chart illustrating an example method of aligning displays in a wearable device.

DETAILED DESCRIPTION

Figure 1A:
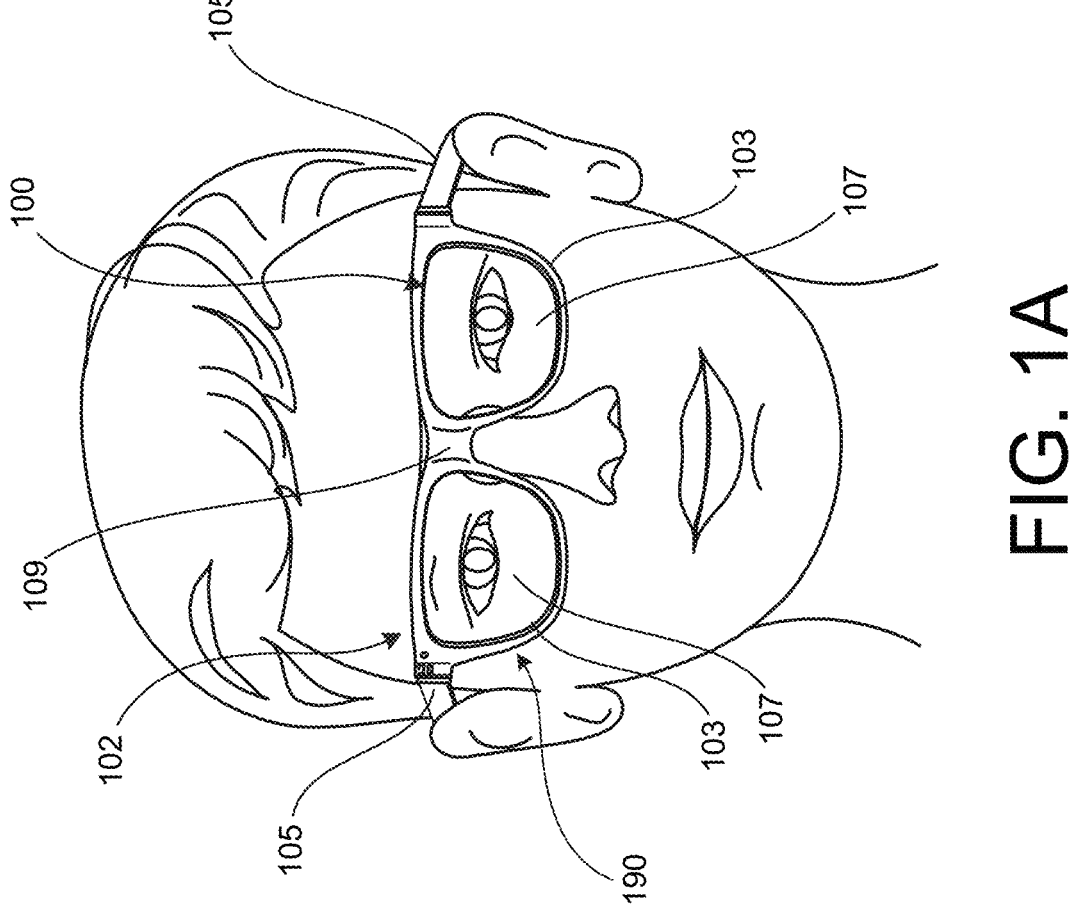
FIG. 1A illustrates an example system, in accordance with implementations described herein.

This disclosure relates to mechanisms for eyewear in augmented or mixed reality (AR/MR) that maintain alignment of the displays in the presence of frame deflections. For example, ophthalmic glasses frames should have some compliance or flexibility for the comfort of the wearer. Such glasses are typically somewhat flexible and/or deformable so that the glasses can be manipulated to adapt to a particular head size and/or shape, a particular arrangement of features, a preferred pose of the glasses on the face, and the like, associated with a user to provide a comfortable fit for the user. Along these lines, a frame of the eyewear can be deformed by, for example, heating and re-forming plastic frames, or bending/flexing frames made of other materials. Thus, flexible or deformable characteristics of the material of the frame of the eyewear may allow the eyewear to be customized to fit a particular user, while still maintaining the functionality of the eyewear.

A technical problem with allowing such flexibility in the frame is that such flexibility may cause misalignment between left and right images, which may provide confusion and discomfort to the user. For example, alignment of the displays may depend on a relationship between material properties of elements of the frame. Nevertheless, in a situation in which the eyewear is in the form of smartglasses including display capability, computing/processing capability, and the like, a flexible or deformable frame may cause a movement of a waveguide in the smartglasses frame. Such a movement of the waveguide may affect the direction of the output light propagation vector, which in turn may result in the left and right displays to become misaligned.

Keeping the frame of the eyewear rigid avoids any flexibility that could cause the displays to move and misalign the camera and eye-tracking images. This, however, may add undesirable weight to the eyewear and cause the user to experience discomfort wearing the eyewear.

Using a control system for the cameras and other sensors mounted on the frame of the eyewear dynamically adjusts the displays for variance of the positions of the displays. Such control systems, however, may add cost and complexity to the augmented reality system. The complexity, along with increasing the cost of the system, may also cause a processing lag because of the complexity of the controls needed to align the left and right displays in real time.

A technical solution to the above-described technical problem includes alignment of displays in a head-mounted wearable device such as AR smartglasses by specifying a relationship between material properties of the frame at the shoulder and nose bridge. For example, such a material relationship may be a rigidity and/or stiffness characteristic. In some implementations, the specified relationship is that a difference between the first bending stiffness and the second bending stiffness is less than a tolerance (e.g., 5% or less).

A technical advantage of the technical solution is that the output light directions on the left and right meet the respective eyes at essentially the same angle (e.g., to within 0.5 degrees.) This reduces or eliminates confusion experienced by the user when the output light directions are incident on the eyes at different angles. Moreover, the technical solution allows for alignment of displays in smartglasses without requiring rigidity in the frame, thus enabling a degree of comfort for the user. Another technical advantage of the above-described technical solution is that complex control systems that may be costly and burdensome are avoided.

Figure 1B:
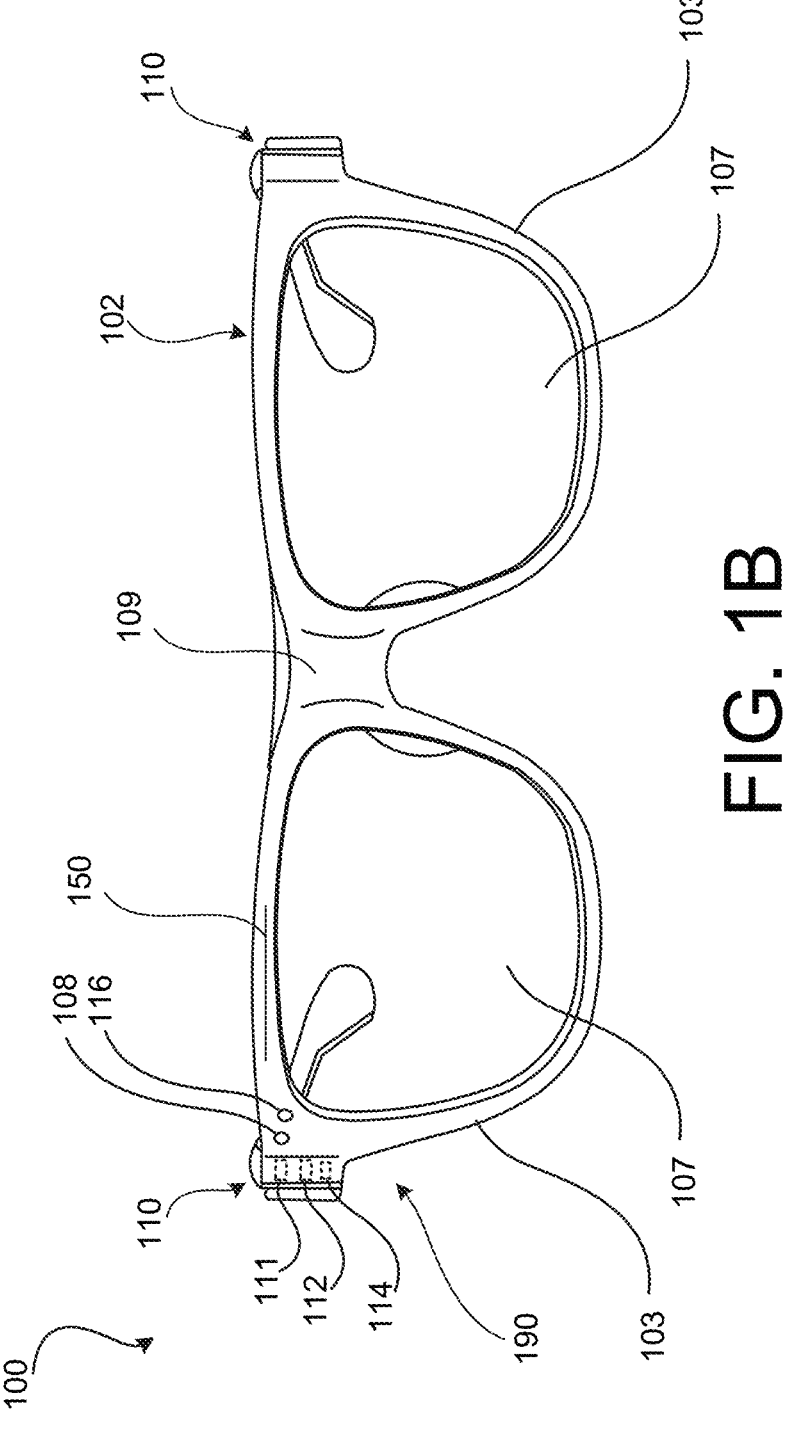
FIG. 1B is a front view.
Figure 1C:
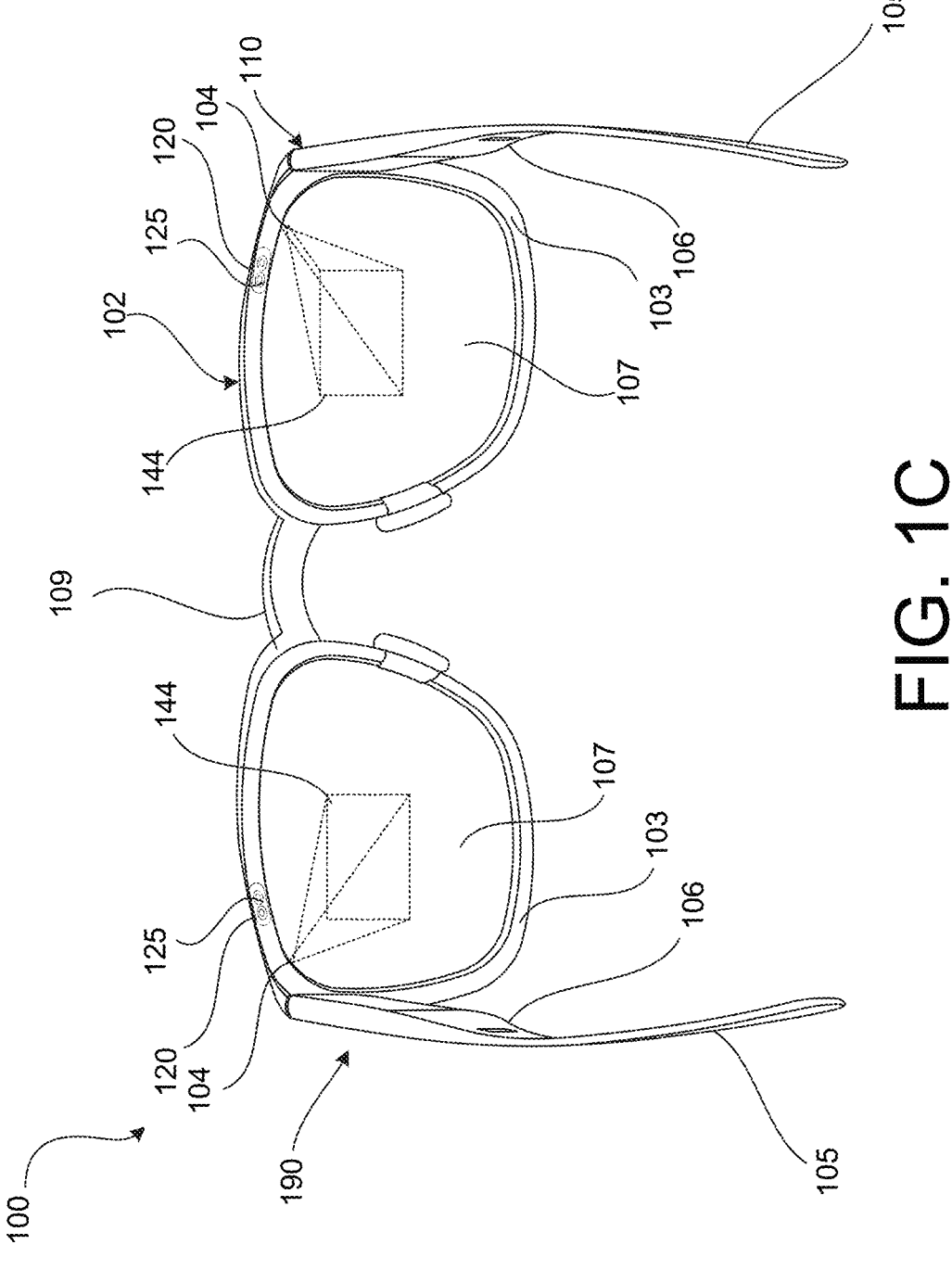
FIG. 1C is a rear view.
Figure 1D:
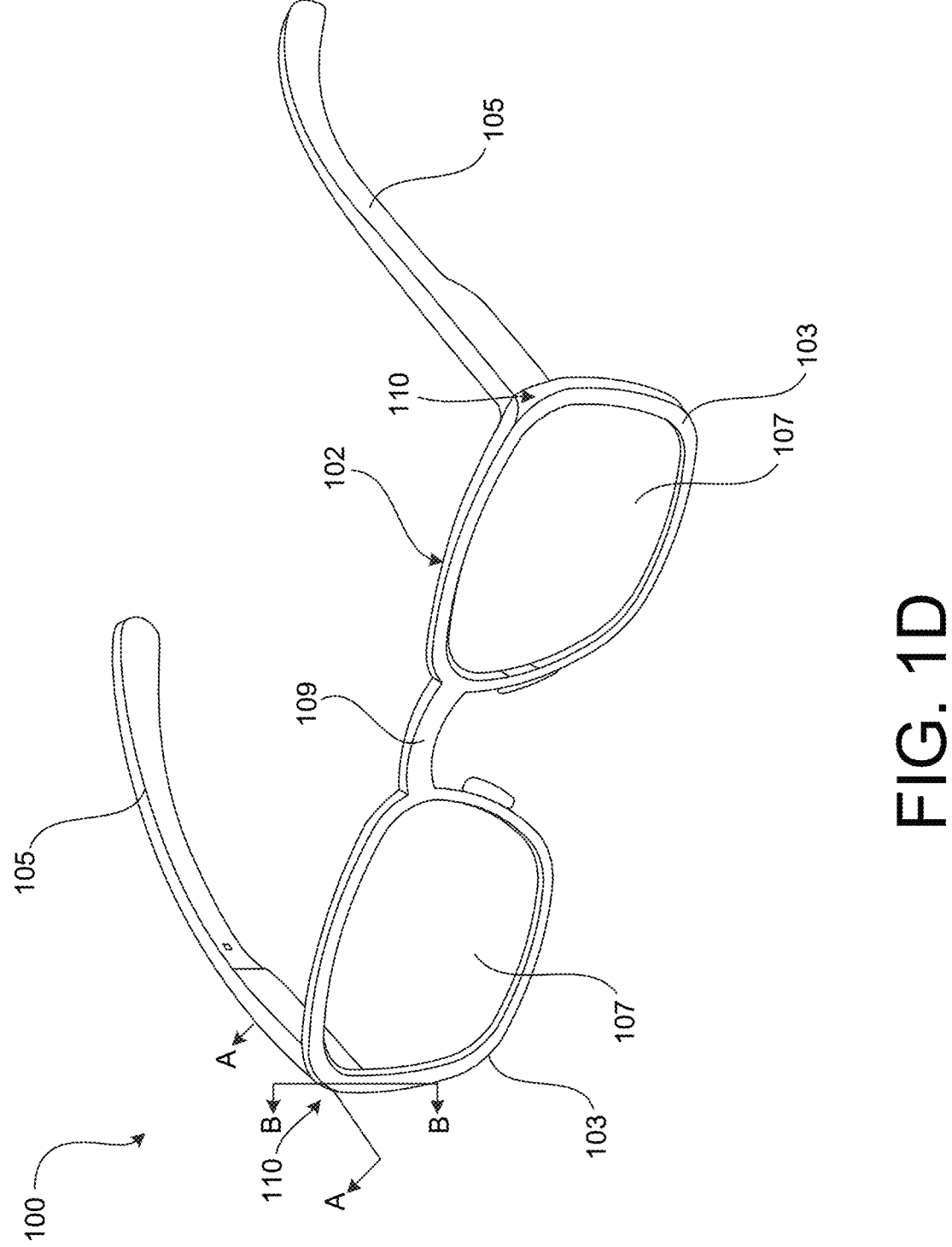
FIG. 1D is a perspective view, of the example head mounted wearable device shown in FIG. 1A, in accordance with implementations described herein.

FIG. 1A illustrates a user wearing an example head mounted wearable device 100. In this example, the example head mounted wearable device 100 is in the form of example smartglasses including display capability and computing/processing capability, for purposes of discussion and illustration. The principles to be described herein may be applied to other types of eyewear, both with and without display capability and/or computing/processing capability. FIG. 1B is a front view, FIG. 1C is a rear view, and FIG. 1D is a perspective view, of the example head mounted wearable device 100 shown in FIG. 1A. As noted above, in some examples, the example head mounted wearable device 100 may take the form of a pair of smartglasses, or augmented reality glasses. The head mounted wearable device 100 shown in FIGS. 1A through 1D includes a nose bridge 109, rim portions 103, and respective arm portions 105. The junctions between the rim portions 103 and arm portions 105 form shoulders. The material in the nose bridge 109 has a first bending stiffness and the material in the shoulders has a second bending stiffness such that the first bending stiffness and the second bending stiffness satisfy a specified relationship.

As shown in FIG. 1B-1D, the example head mounted wearable device 100 includes a frame 102. The frame 102 includes a front frame portion defined by rim portions 103 surrounding respective optical portions in the form of lenses 107, with a bridge portion 109 connecting the rim portions 109. Arm portions 105 are coupled, for example, pivotably or rotatably coupled, to the front frame by hinge portions 110 at the respective rim portion 103. In some examples, the lenses 107 may be corrective/prescription lenses. In some examples, the lenses 107 may be an optical material including glass and/or plastic portions that do not necessarily incorporate corrective/prescription parameters. A display device 104 may be coupled in a portion of the frame 102. In the example shown in FIGS. 1B and 1C, the display device 104 is coupled in the arm portion 105 of the frame 102. With the display device 104 coupled in the arm portion 105, an eye box 140 extends toward the lens(es) 107, for output of content at an output coupler 144 at which content output by the display device 104 may be visible to the user. In some examples, the output coupler 144 may be substantially coincident with the lens(es) 107. In some examples, the head mounted wearable device 100 can also include an audio output device 106 (such as, for example, one or more speakers), an illumination device 108, a sensing system 111, a control system 112, at least one processor 114, and an outward facing image sensor 116, or camera 116. In some examples, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics 150 may be used to depict content on the display device 104.

In some examples, the head mounted wearable device 100 may include a gaze tracking device 120 including, for example, one or more sensors 125, to detect and track eye gaze direction and movement. Data captured by the sensor(s) 125 may be processed to detect and track gaze direction and movement as a user input. In some examples, the sensing system 111 may include various sensing devices and the control system 112 may include various control system devices including, for example, one or more processors 114 operably coupled to the components of the control system 112. In some examples, the control system 112 may include a communication module providing for communication and exchange of information between the wearable computing device 100 and other external devices.

As mentioned above, the material in the nose bridge 109 has a first bending stiffness and the material in the shoulders has a second bending stiffness such that the first bending stiffness and the second bending stiffness satisfy a specified relationship. In some implementations, the specified relationship is that a difference between the first bending stiffness and the second bending stiffness is less than a tolerance, e.g., 5% of the first bending stiffness, 5% of the average of the first bending stiffness and the second bending stiffness, etc. This allows for alignment of displays even when the frame 102 is flexed.

Figures 2A, 2B:
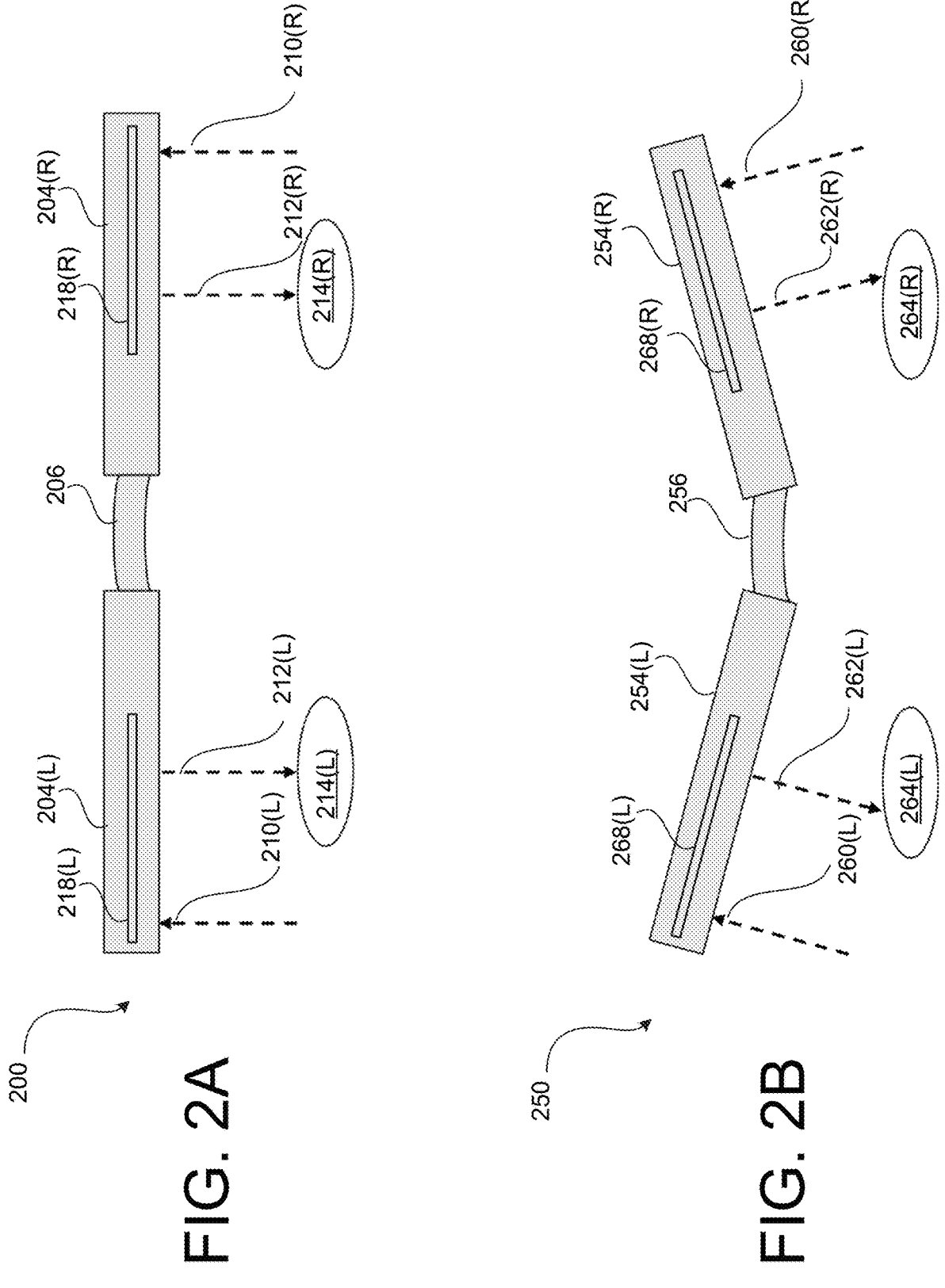
FIGS. 2A, 2B, and 2C illustrate an example bending of a frame of a wearable device.

FIG. 2A is a top view illustrating an example unflexed frame 200 of smartglasses. As shown in FIG. 2A, the frame 200 includes left and right arm portions 202(L,R) housing a source of beams of input radiation 210(L,R), frame front portions 204(L,R) (i.e., rim portions) housing respective waveguides 218(L,R) configured to combine real and virtual images and output the images in beams of output radiation 212(L,R), and nose bridge 206. In FIG. 2A, the beams of input radiation 210(L,R) propagate in a direction parallel to normal to the waveguide 218(L,R) and, accordingly, the beams of output radiation 212(L,R) propagate in a direction substantially parallel to the respective beams of input radiation 210(L,R). In FIG. 2A, radiation emitted into each waveguide is perpendicular to each waveguide 218(L,R), and therefore radiation out of each waveguide 218(L,R) is also perpendicular to each waveguide 218(L,R).

FIG. 2B is a top view illustrating an effect of an example flexed frame 250 of smartglasses on input and output ray directions. As shown in FIG. 2B, the frame 250 includes left and right arm portions 252(L,R) housing a source of beams of input radiation 260(L,R), frame front portions 254(L,R) (i.e., rim portions) housing respective waveguides 268(L,R) configured to combine real and virtual images and output the images in beams of output radiation 262(L,R), and nose bridge 256. In FIG. 2B, the beams of input radiation 260(L,R) remain normal to the waveguides 268(L,R). In this case, the output will also be normal to the waveguides 268(L,R). Nevertheless, the left and right beams of output radiation 262(L,R) are incident on the user's left and right eyes at similar angles because the bending stiffness of the material in the nose bridge 256 has a specified relationship with the bending stiffness of the material in the shoulder (not shown).

Figure 2C:
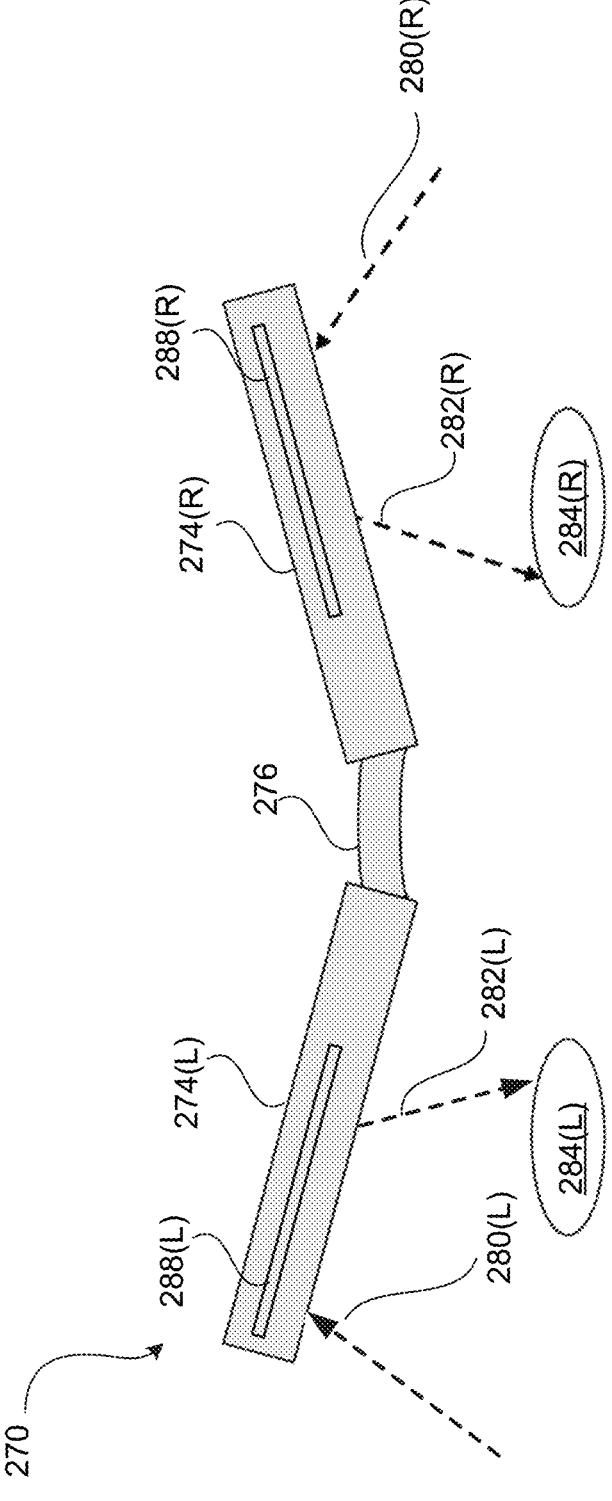

FIG. 2C is a top view illustrating an effect of an example flexed frame 270 of smartglasses on input and output ray directions. As shown in FIG. 2C, the frame 270 includes left and right arm portions 272(L,R) housing a source of beams of input radiation 280(L,R), frame front portions 274(L,R) (i.e., rim portions) housing a waveguide (not shown) configured to combine real and virtual images and output the images in beams of output radiation 282(L,R), and nose bridge 276. There is a flexing of the frame 270 through the nose bridge 276—defining deflection angle $\theta_B$—and at the junctions between rim portions 274(L,R) and respective arm portions 280(L,R), i.e., the shoulders—defining deflection angle $\theta_S$. In general, $\theta_B \neq \theta_S$; in that case the beams of output radiation 282(L,R) are differently oriented at each eye. This may cause misalignment of the left and right displays and confusion for the user. Nevertheless, because the bending stiffness of the nose bridge 276 has a specified relationship with the bending stiffness of the shoulder, the left and right beams of output radiation 282(L,R) are incident on the user's left and right eyes at essentially the same angles (e.g., equal to within 0.5 degrees).

Figures 3A, 3B:
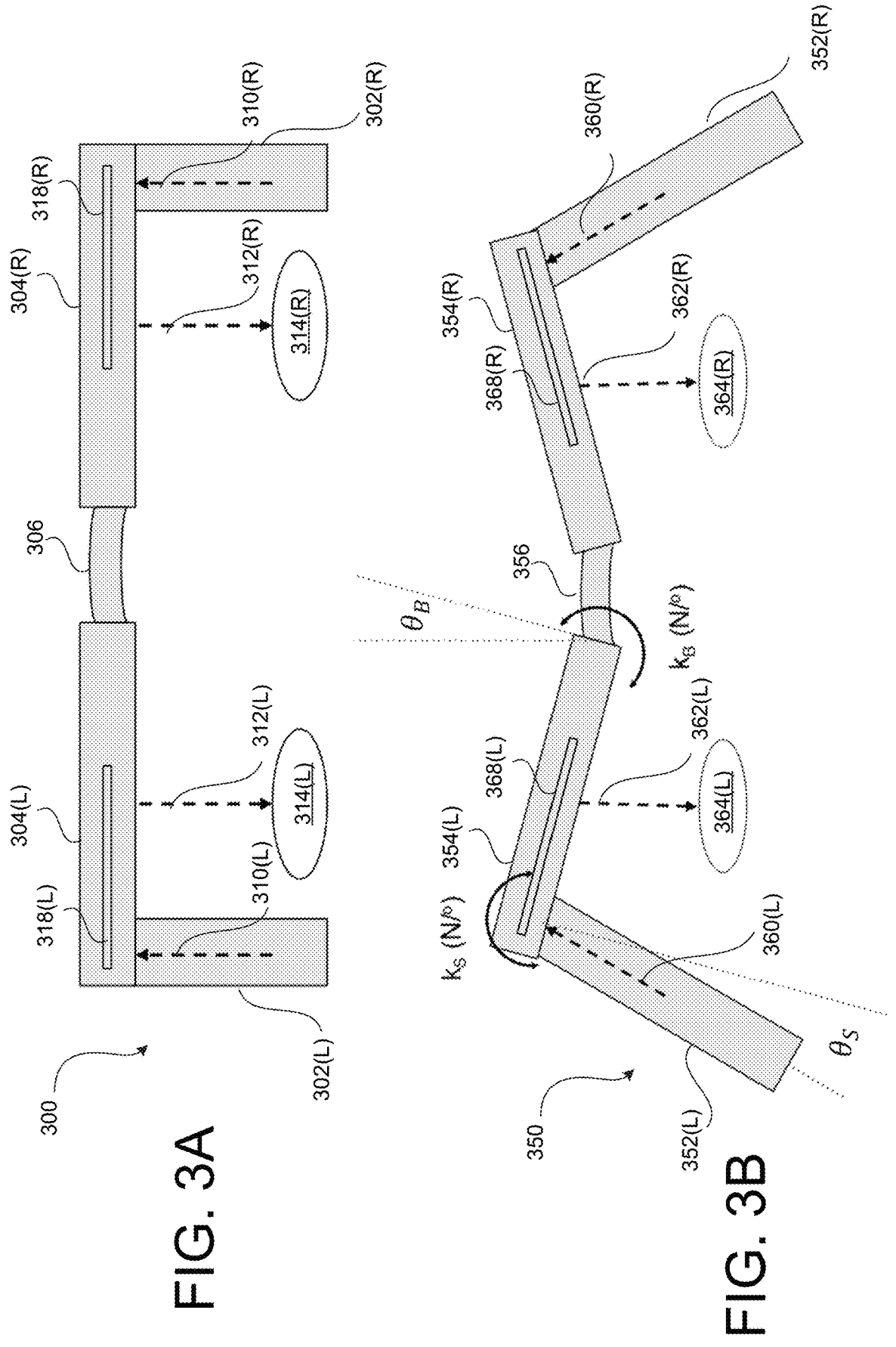
FIGS. 3A and 3B illustrate an example improved system using a partial retroreflector, in accordance with implementations described herein.

FIGS. 3A and 3B illustrate an example improvement using materials in the nose bridge and shoulders having proportional bending stiffnesses, in accordance with implementations described herein. As shown in FIGS. 3A and 3B, the improved system includes a waveguide WG with an incoupler IC on a surface of the WG and an outcoupler OC on the same surface. In some implementations, the IC and OC include a grating (e.g., diffraction, holographic, reflective, transmissive). In some implementations, the diffraction grating is a blazed diffraction grating. In some implementations, the diffraction grating is a volume holographic grating.

The improved system as shown in FIGS. 3A and 3B further includes a camera for capturing images of real objects. As shown in FIG. 3A, the frame 300 includes left and right arm portions 302(L,R) housing a source of beams of input radiation 310(L,R), frame front portions 304(L,R) (i.e., rim portions) housing respective waveguides (WG) 318(L,R) configured to combine real and virtual images and output the images in beams of output radiation 312(L,R), and nose bridge 306. In FIG. 3A, the beams of input radiation 310(L,R) propagate in a direction parallel to normal to the WG 318(L,R) and, accordingly, the beams of output radiation 312(L,R) propagate in a direction substantially parallel to the respective beams of input radiation 310(L,R). In FIG. 3A, radiation emitted into each WG 318(L,R) is perpendicular to the WG 318(L,R), and therefore radiation out of the WG 318(L,R) is also perpendicular to the WG.

FIG. 3B is a top view of a flexed frame 350. As shown in FIG. 3B, the frame 350 includes left and right arm portions 352(L,R) housing a source of beams of input radiation 360(L,R), frame front portions 354(L,R) (i.e., rim portions) housing a waveguide (not shown) configured to combine real and virtual images and output the images in beams of output radiation 362(L,R), and nose bridge 356. There is a flexing of the frame 350 through the nose bridge 356—defining deflection angle $\theta_B$—and at the junctions between rim portions 274(L,R) and respective arm portions 280(L, R), i.e., the shoulders—defining deflection angle $\theta_S$. The improved system has the shoulders and rim portions made from materials having proportional bending stiffnesses. The result is that the resultant output display vector can be maintained, even when the temples are deflected. In some implementations, the bending stiffnesses of the nose bridge and the shoulders are equal to within a tolerance (e.g., less than 5%); ideally, $\theta_B = \theta_S$.

FIG. 4 is a flow chart illustrating a method 400 of aligning displays in smartglasses.

At 402, in a frame of a head-mounted wearable device that includes a left display and a right display, the left display is mounted on a left rim portion of a frame.

At 404, the right display is mounted on a right rim oof the frame.

At 406, the left rim portion and the right rim portion are joined with a nose bridge, the nose bridge being formed of a first material having a first bending stiffness.

At 408, a left shoulder is formed with the left rim portion and a left arm portion of the frame.

At 410, a right shoulder is formed with the right rim portion and a left arm portion of the frame, each of the left shoulder and right shoulder being formed of a second material having a second bending stiffness, the first bending stiffness and the second bending stiffness satisfying a specified relationship.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A head-mounted wearable device, including:
a left display and a right display;
a frame worn by a user, including:
a left rim portion in which the left display is mounted;
a right rim portion in which the right display is mounted;
a nose bridge joining the left rim portion and the right rim portion, the nose bridge being formed of a first material having a first bending stiffness;
a left arm portion forming a left shoulder with the left rim portion; and
a right arm portion forming a right shoulder with the right rim portion, each of the left shoulder and right shoulder being formed of a second material having a second bending stiffness, the first bending stiffness and the second bending stiffness satisfying a specified relationship.

2. The head-mounted wearable device as in claim 1, wherein the specified relationship is that a difference between the first bending stiffness and the second bending stiffness is less than a tolerance.

3. A method, comprising:
in a frame of a head-mounted wearable device that includes a left display and a right display:
mounting the left display on a left rim portion of the frame;
mounting the right display on a right rim portion of the frame;
joining the left rim portion and the right rim portion with a nose bridge, the nose bridge being formed of a first material having a first bending stiffness;
forming a left shoulder with the left rim portion and a left arm portion of the frame; and
forming a right shoulder with the right rim portion and a right arm portion of the frame, each of the left shoulder and right shoulder being formed of a second material having a second bending stiffness, the first bending stiffness and the second bending stiffness satisfying a specified relationship.

4. The method as in claim 3, wherein the specified relationship is that a difference between the first bending stiffness and the second bending stiffness is less than a tolerance.

5. The head-mounted wearable device as in claim 2, wherein the tolerance is based on the first bending stiffness and the second bending stiffness.

6. The head-mounted wearable device as in claim 5, wherein the tolerance is based on an average of the first bending stiffness and the second bending stiffness.

7. The method as in claim 1, wherein the head-mounted wearable device includes a pair of augmented reality glasses.

8. The method as in claim 4, wherein the tolerance is based on the first bending stiffness and the second bending stiffness.

9. The method as in claim 8, wherein the tolerance is based on an average of the first bending stiffness and the second bending stiffness.

10. The method as in claim 3, wherein the head-mounted wearable device includes a pair of augmented reality glasses.

* * * * *